US010060494B2

United States Patent
Battek et al.

(10) Patent No.: US 10,060,494 B2
(45) Date of Patent: Aug. 28, 2018

(54) MOUNT ASSEMBLY AND METHOD OF ADJUSTING STIFFNESS

(71) Applicant: BeijingWest Industries, Co., Ltd., Beijing (CN)

(72) Inventors: Wojciech Battek, Cracow (PL); Tomasz Szostek, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/352,943

(22) Filed: Nov. 16, 2016

(65) Prior Publication Data
US 2017/0167558 A1 Jun. 15, 2017

(30) Foreign Application Priority Data

Dec. 10, 2015 (CN) .......................... 2015 1 0908731

(51) Int. Cl.
*F16F 1/36* (2006.01)
*F16F 1/44* (2006.01)
*F16H 25/24* (2006.01)

(52) U.S. Cl.
CPC ............ *F16F 1/3615* (2013.01); *F16F 1/445* (2013.01); *F16H 25/2454* (2013.01); *F16F 2228/066* (2013.01)

(58) Field of Classification Search
CPC ...... F16F 1/3615; F16F 1/3732; F16F 1/3814; F16F 2228/066; F16F 2228/08
See application file for complete search history.

(56) References Cited

U.S. PATENT DOCUMENTS

| 5,213,315 A | * | 5/1993 | Hartel | B60K 5/1283 267/140.11 |
| 5,794,912 A | * | 8/1998 | Whittaker | F16F 1/3615 248/188.4 |
| 5,924,670 A | * | 7/1999 | Bailey | F16F 1/3615 188/380 |
| 2007/0200311 A1 | * | 8/2007 | Beck | B60G 11/24 280/124.16 |

FOREIGN PATENT DOCUMENTS

DE 102014001660 A1 8/2014
EP 0922877 A2 6/1999

OTHER PUBLICATIONS

European Search Report dated May 8, 2017, Eight (8) Pages.

* cited by examiner

*Primary Examiner* — Bradley T King
(74) *Attorney, Agent, or Firm* — William H. Honaker; Dickinson Wright PLLC (57) ABSTRACT

A method and mount assembly comprising a screw mechanism including a sleeve rotatable relative to the first housing and defining an internal screw-thread for adjusting the stiffness in the mount assembly in a vehicle. A collar non-rotatably secured to the plate and extends axially into the sleeve and defines an external screw-thread engaging the internal screw-thread of the sleeve. The internal screw-thread and the external screw-thread are self-locking in a static condition and prevent relative rotation between the sleeve and the collar below a predetermined force therebetween. A fluid pressure in the first housing overcomes the predetermined force and causes the sleeve to rotate from the static condition for moving the collar and the plate axially to change the stiffness of the pad.

12 Claims, 6 Drawing Sheets

MOUNT ASSEMBLY AND METHOD OF ADJUSTING STIFFNESS

CROSS-REFERENCE TO RELATED APPLICATIONS

This application claims priority to Chinese Patent Application Serial No. 201510908731.0 filed on Dec. 10, 2015, and titled "MOUNT ASSEMBLY AND METHOD OF ADJUSTING STIFFNESS", the entire disclosure of which is hereby incorporated by reference.

BACKGROUND OF THE INVENTION

1. Field of the Invention

A mount assembly in a vehicle and a method of adjusting stiffness.

2. Description of the Prior Art

Such prior art mount assemblies typically comprise a first housing extending around and along a center axis and define a first cavity and a second housing extending around and along the center axis from the first housing to a cap to define a second cavity. These prior art mount assemblies also include a pad of an elastomeric material having a stiffness with the pad disposed on the center axis in the second cavity between the plate and the cap and a plate disposed on the center axis in the second cavity. An actuator is disposed on the center axis in the first cavity and extends along the center axis into the second cavity and coupled to the plate. Methods for adjusting the stiffness in the prior art mount assemblies in a vehicle include compressing the pad of an elastomeric material to establish a predetermined stiffness of the mount. The step of sensing external and gravitational forces being applied to the vehicle and integrating the external and gravitational forces to establish a plurality of variable and instantaneous operating conditions of the vehicle. An example of such a mount and method of adjusting the stiffness of the mount in a vehicle is shown in U.S. Pat. No. 5,333,846 granted to Komakia et al. on Aug. 2, 1994.

SUMMARY OF THE INVENTION

The subject invention provides a mount comprising the actuator being a screw mechanism that includes a sleeve rotatable about a center axis relative to the first housing and defines an internal screw-thread facing the center axis. The screw mechanism includes a collar that is disposed along the center axis and extends axially into the sleeve from and non-rotatably secured to the plate. The collar defines an external screw-thread facing away from the center axis and engages the internal screw-thread of the sleeve for causing axial movement of the collar and the plate in response to relative rotation between the sleeve and the collar. The external screw-thread and the internal screw-thread have a coefficient of friction therebetween and a lead angle with the tangent of the lead angle less than the coefficient of friction for providing self-locking between the screw-threads and the screw-threads prevent relative rotation between the sleeve and the collar below a predetermined force therebetween. In operation, a fluid pressure in the first housing overcomes the predetermined force and causes the sleeve to rotate around the center axis for moving the collar and the plate axially along the center axis to change the stiffness of the pad and an absence of the fluid pressure results in the self-locking between the screw-threads.

The invention further provides for a method of adjusting the stiffness in the mount assembly in the vehicle comprising of multiplying hydraulic fluid pressure from a vehicle hydraulic system in response to various ones of the operating conditions of the vehicle. The step of rotating the screw mechanism in response to the multiplied hydraulic pressure in response to various ones of the operating conditions of the vehicle to compress and adjust the stiffness of the pad and to establish a predetermined stiffness position. The step of terminating the multiplied hydraulic pressure to establish a static condition and the self-locking of the screw mechanism to hold the predetermined stiffness position of the pad.

The invention in its broadest aspect provides a mount assembly capable of achieving multiple compressions states of the pad resulting in multiple stiffness of the mount by self-locking of the screw-mechanism in a static condition to isolate the external forces from the fluid in the mount assembly for preventing variations of fluid pressure in the mount assembly due to the external forces and for preventing variations of fluid pressure from causing wear and leakage in the mount assembly.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a mount assembly 20 is generally shown for connecting a frame and a wheel assembly of a vehicle and for dampening vibrations between the frame and the wheel assembly to isolate the frame from vibrations caused by operating conditions of the vehicle. It should be appreciated that the mount assembly 20 could be utilized on various types of vehicles including, but not limited to, automobiles, motorcycles and all-terrain vehicles.

With reference to the Figures, the mount assembly 20 includes a first housing, generally indicated at 22, having a sidewall 24 defining a cylindrical shape and extending annularly around and along a center axis A between a base 26 and a top 28. The base 26 is of a circular shape and the top 28 is of a circular shape and is parallel to the base 26. The first housing 22 defines a first cavity extending between the top 28 and the base 26 and the sidewall 24. The top 28 defines a top-passage 30 disposed about and concentric with the center axis A, and the base 26 defines a center passage 32 disposed about and concentric with the center axis A.

The mount assembly 20 also includes a second housing, generally indicated at 34, of a cylindrical shape and having a body 36 and a cap 38. The body 36 extends annularly around and along the center axis A from the top 28 of the first housing 22 to the cap 38 to define a second cavity. The cap 38 defines a first passage 40 disposed about and concentric with the center axis A.

The mount assembly 20 further includes a plate 42 of a circular shape and having a peripheral edge. The plate 42 is disposed about and concentric with the center axis A in the second cavity of the second housing 34.

A pad 44 of an elastomeric material with a stiffness and of a donut shape is disposed in the second cavity about and concentric with the center axis A between the plate 42 and the cap 38. The pad 44 defines a center opening 46 extending along the center axis A to define the donut shape. As known in the art, the pad 44 may include an insert of a metallic material for providing rigidity to the pad 44 and/or which may be a connected through the mount assembly 20 to the vehicle.

Figure 3:
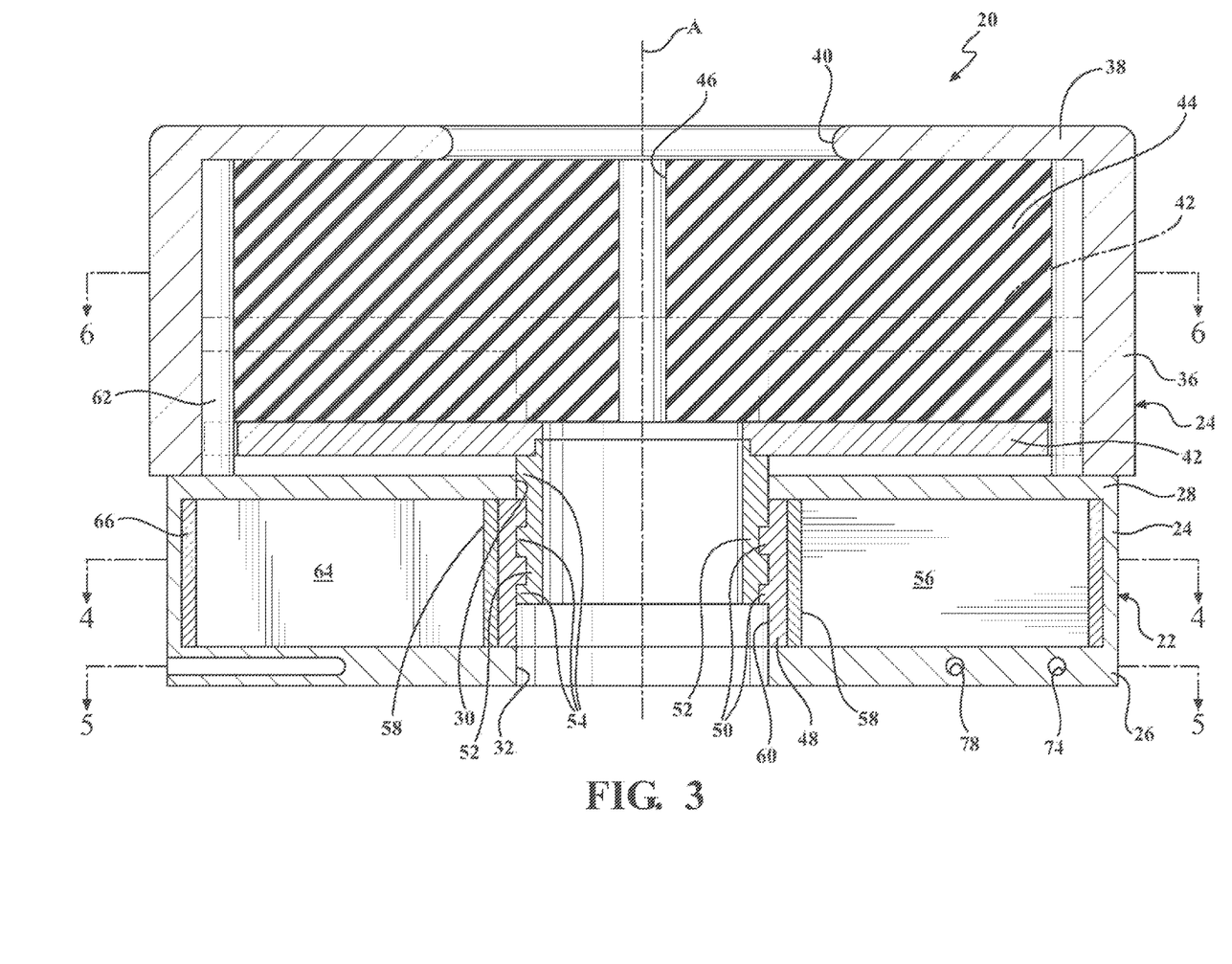
FIG. 3 is a cross-sectional view of the mount assembly taken along line 3-3 of FIG. 4.
Figure 4:
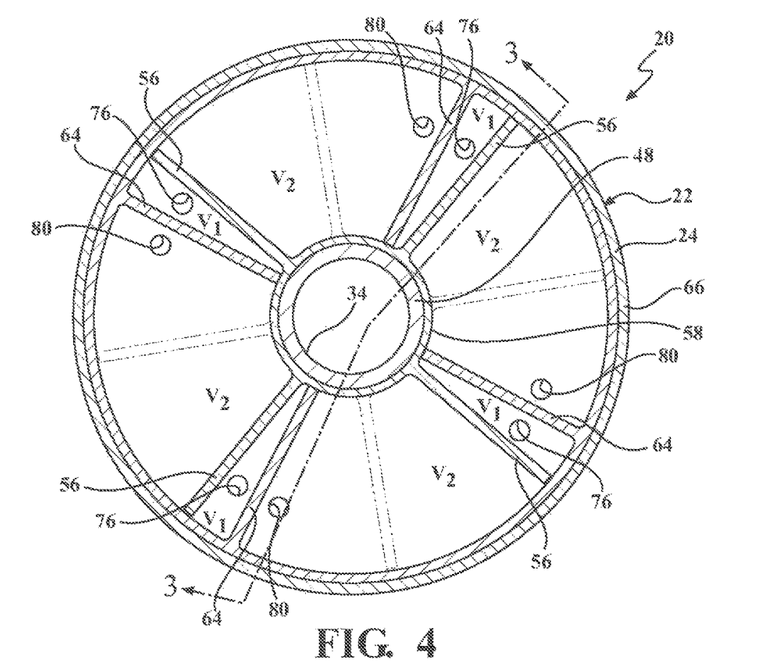
FIG. 4 is a cross-sectional view of the mount assembly taken along line 4-4 of FIG. 3.
Figure 5:
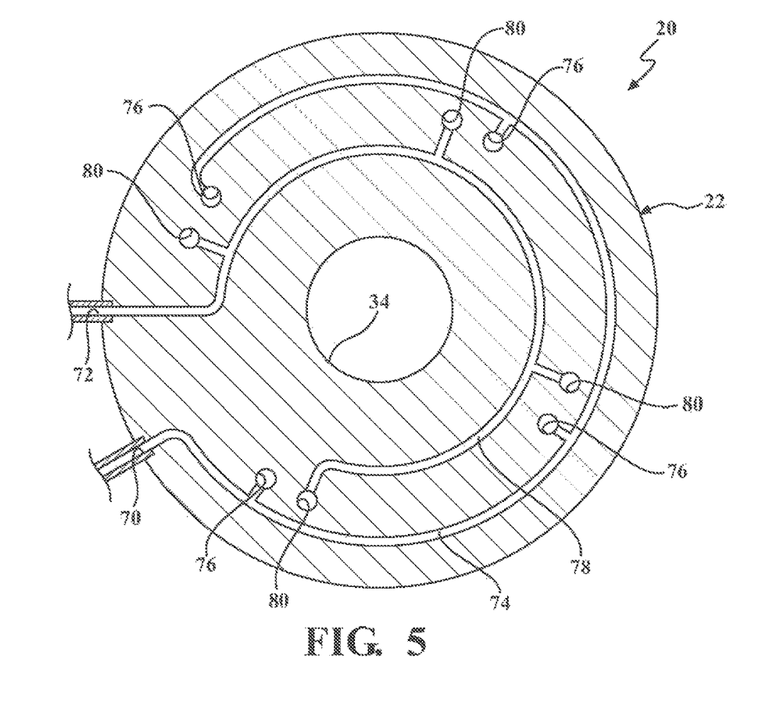
FIG. 5 is a cross-sectional view of the mount assembly taken along line 5-5 of FIG. 3.

As shown in the cross-section in FIG. 3, the mount assembly 20 includes an actuator 48, 50, 52, 54, 56, 58 that is coupled to the plate 42 and disposed on the center axis A in the first cavity of the first housing 22. The actuator 48, 50, 52, 54, 56, 58 extends along the center axis A through the top-passage 30 into the second cavity of the second housing 34 for moving the plate 42 axially along the center axis A for compressing and decompressing the pad 44 to change the stiffness of the pad 44, i.e., the stiffness or resistance of the pad 44 is proportional to the degree of compression or compactness of the pad 44.

In the preferred embodiment of the present invention the actuator 48, 50, 52, 54, 56, 58 is a screw mechanism that includes a sleeve 48 of a cylindrical shape that extends about the center axis A in the first cavity and is disposed adjacent the base 26 and extends axially to the top 28. The sleeve 48 is rotatable about the center axis A relative to the first housing 22 and defines a second passage 60 that extends about the center axis A and is coincident and coexistent with the center passage 32 in the base 26. The sleeve 48 includes a first plurality of roots and crests that extend helically and face the center axis A to define an internal screw-thread 50.

Figure 2:
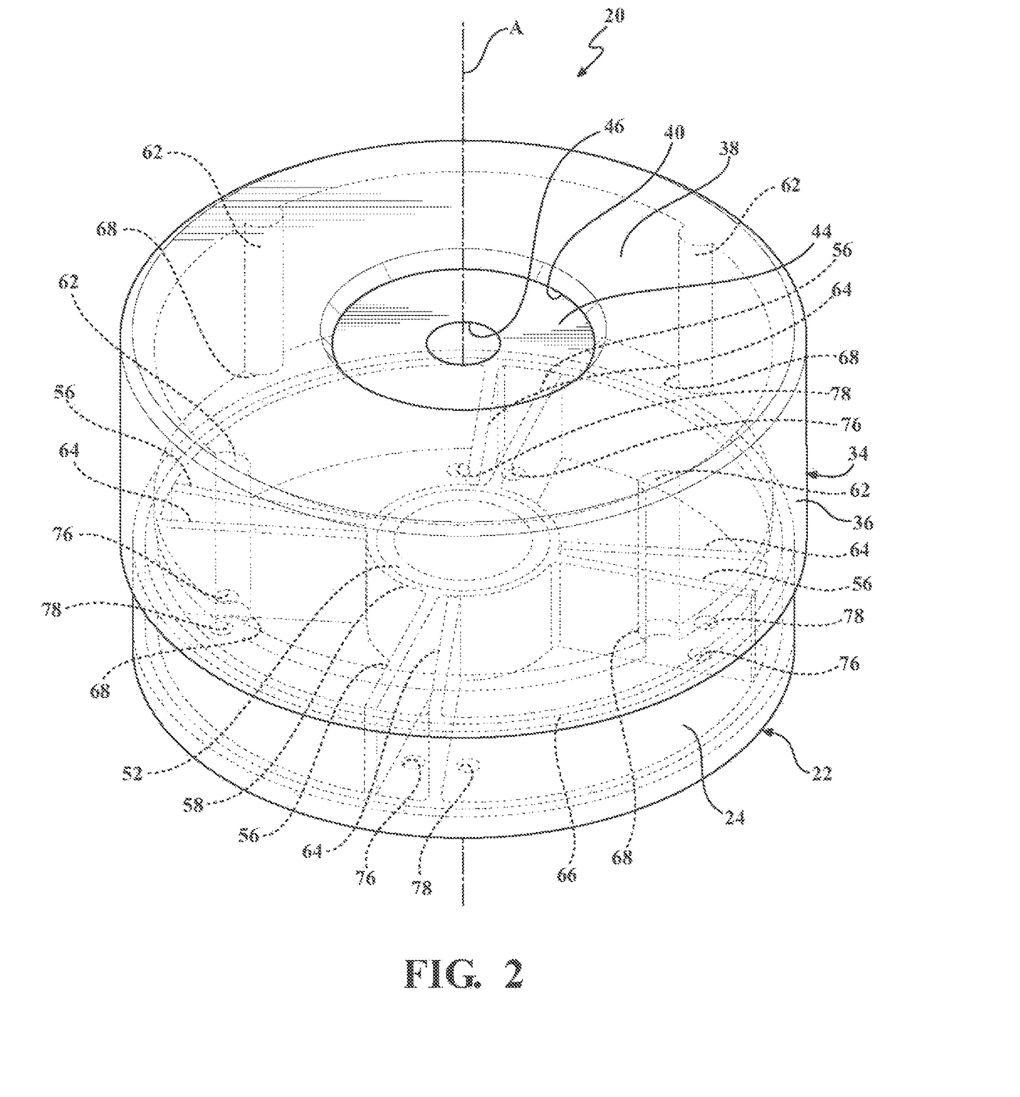
FIG. 2 is a perspective view of the mount assembly including hidden lines showing the chambers and screw mechanism.
Figure 6:
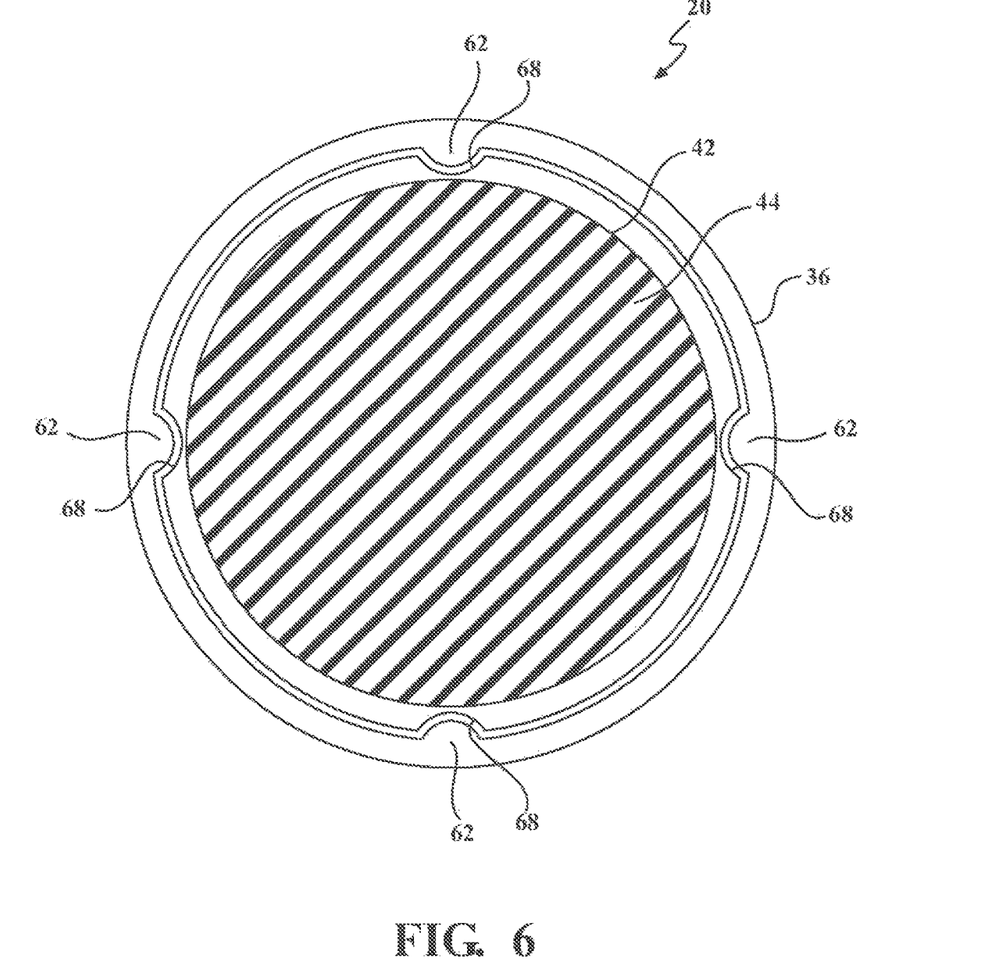
FIG. 6 is a cross-sectional view of the mount assembly taken along line 6-6 of FIG. 3.
Figure 7:
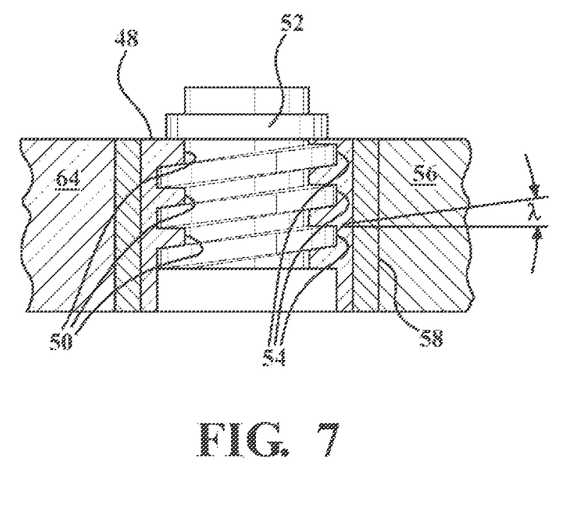
FIG. 7 is a side view of the screw-mechanism of the mount assembly.

As shown in FIGS. 2, 3 and 6, the second housing 34 also includes a plurality of four ribs 62 that are each semi-circular in cross section and extend inwardly from the body 36 and linearly between the top 28 and the cap 38. The ribs 62 are spaced annularly equally at ninety degrees from each other. It is to be appreciated that the present invention can be achieved with any number of ribs 62 and the ribs 62 can be rectangular or any other shape to prevent rotation of the plate 42.

The screw mechanism further includes a collar 52 non-rotatably secured to the plate 42 as by a force fit or welding. The collar 52 is of a cylindrical shape and is disposed along and concentric with the center axis A and extends axially into threaded engagement with the sleeve 48. The collar 52 has a second plurality of roots and crests extending helically and facing away from the center axis A to define an external screw-thread 54 that engages the internal screw-thread 50 of the sleeve 48 for moving the sleeve 48 axially in response to relative rotation between the sleeve 48 and the collar 52.

Referring to FIG. 3, the external screw-thread 54 and the internal screw-thread 50 have a coefficient of friction μ therebetween and a lead angle λ. The tangent of the lead angle λ is less than the coefficient of friction μ to provide self-locking between the screw-threads 50, 54. Accordingly, the screw-threads 50, 54 prevent relative rotation between the sleeve 48 and the collar 52 below a predetermined force therebetween. It is to be appreciated that the screw mechanism is self-locking in a static state. It is further to be appreciated that external forces applied to the mount assembly 20 will be taken by the self-locking of the screw-mechanism.

The first housing 22 further includes a plurality of four partitions 64 disposed in the first cavity. The partitions 64 extend radially from the center axis A between the sidewall 24 and the sleeve 48 and axially between the base 26 and the top 28 and are spaced annularly equally at ninety degrees from each other to define and seal a plurality of four chambers V1, V2 between the plurality of four partitions 64 for sealing a fluid in each of the plurality of four chambers V1, V2. The partitions 64 are interconnected by a ring-wall 66 extending annularly and coexist with the sidewall 24 of the first housing 22. It is to be appreciated that the present invention can be achieved with any number of partitions 64 in the static condition.

The enabling embodiment of the screw mechanism includes a plurality of four vanes 56. But the present invention can be practiced with any number of vanes 56. The vanes 56 extend radially from the sleeve 48 into respective ones of the chambers V1, V2 in sealing relationship between the base 26 and the top 28 and the sidewall 24 with each being spaced from and between two of the partitions 64 to divide each one of the chambers V1, V2 into a first volume V1 and a second volume V2. The vanes 56 are coupled to and rotatable with the sleeve 48 in the chambers V1, V2 around the center axis A clockwise from a first position to a second position and counterclockwise from the second position to the first position to vary the ratio between the volumes V1, V2 in each of the chambers V1, V2. More specifically, the vanes 56 are integral with or welded to a ring-rotor 58 which is non-rotatably secured to the sleeve 48. The partitions 64 are in sealing and sliding engagement with the ring-rotor 58 and the vanes 56 are likewise in sealing and sliding engagement with the ring-wall 66 to define and seal the first volumes V1 from the second volumes V2.

As best shown in FIG. 2, the plate 42 slidably engages the body 36 and has a plurality of four grooves 68 with each groove 68 being semi-circular and sized to receive and slidably engage one of the plurality of four ribs 62 for preventing the plate 42 and the collar 52 from rotating about the center axis A while allowing axial movement of the collar 52 and the plate 42 in response to rotation of the sleeve 48 by rotation of the plurality of four vanes 56 clockwise from the first position to the second position and counter-clockwise from the second position to the first position. It is to be appreciated that the present invention can be achieved with any number of grooves 68.

The first housing 22 further includes a first port 70 that extends radially through the sidewall 24 at the base 26 of the first housing 22 and a second port 72 that extends radially through the sidewall 24 at the base 26 of the first housing 22 and spaced annularly from the first port 70.

A first conduit 74 extends from the first port 70 annularly around the center axis A in the base 26 and is spaced radially inwardly from the sidewall 24 of the first housing 22. The first conduit 74 includes a plurality of four first apertures 76 that establish fluid communication between the first conduit 74 and each of the first volumes V1. Each one of the first apertures 76 is spaced adjacent to and on the side of and counterclockwise from each one of the plurality of four partitions 64 for supplying the fluid through the first port 70 and the first conduit 74 into each one of the first volumes V1.

It is to be appreciated that the present invention can be achieved with any number of first apertures 76.

A second conduit 78 extends from the second port 72 annularly around the center axis A in the base 26 and is spaced radially between the first conduit 74 and the sleeve 48. The second conduit 78 includes a plurality of four second apertures 80 establishing fluid communication between the second conduit 78 and each of the second volumes V2. Each one of the second apertures 80 is spaced adjacent to and on the side of and clockwise from each one of the plurality of partitions 64 for supplying the fluid through the second port 72 and the second conduit 78 into each one of the second volumes V2. It is to be appreciated that the present invention can be achieved with any number of second apertures 80.

A fluid pressure in each one of the first volumes V1 greater than a fluid pressure in each one of the second volumes V2 overcomes the predetermined force between the screw-threads 50, 54 and causes a rotation of the plurality of four vanes 56 counterclockwise around the center axis A in a direction from the second position toward the first position. The counterclockwise rotation causes the sleeve 48 to also rotate from the second position to the first position. In response to the rotation of the vanes 56 and the sleeve 48 in the direction from the second position towards the first position, the collar 52 and the plate 42 move axially along the center axis A in a direction away from the cap 38 for decompressing the pad 44 and decreasing the stiffness of the pad 44. Alternatively, a fluid pressure in each one of the second volumes V2 greater than a fluid pressure in each one of the first volumes V1 overcomes the predetermined force between the screw-threads 50, 54 and rotates the plurality of four vanes 56 clockwise around the center axis A in a direction from the first position towards the second position. The clockwise rotation causes the sleeve 48 to also rotate from the first position to the second position. In response to the rotation of the vanes 56 and the sleeve 48 in a direction from the first position towards the second position, the collar 52 and the plate 42 are moved axially along the center axis A in a direction towards the cap 38 to compress the pad 44 and increase the stiffness of the pad 44. An absence of the fluid pressure in the chambers V1, V2 results in the self-locking between the screw-threads 50, 54.

Figure 1:
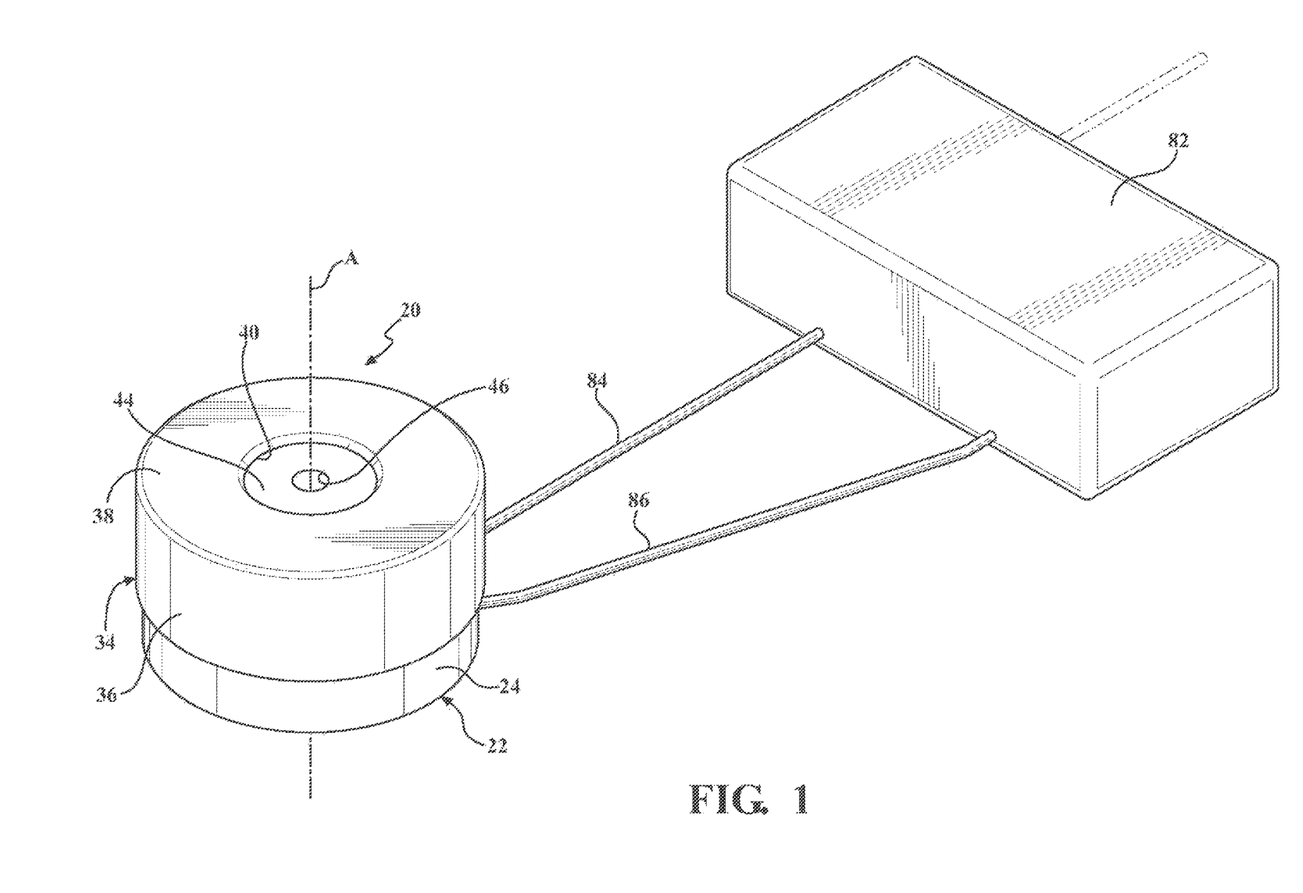
FIG. 1 is a perspective view of the mount assembly coupled to a pressure multiplier.

In the preferred embodiment of the present invention and as best shown in FIG. 1, the mount assembly 20 is coupled to a pressure multiplier 82 by a first fluid supply line 84 and a second fluid supply line 86 for providing fluid communication between the pressure multiplier 82 and the mount assembly 20. The pressure multiplier 82 is also coupled to and in fluid communication with a hydraulic system of the vehicle. The first fluid supply line 84 extends from the pressure multiplier 82 to the first port 70 for providing fluid communication between the pressure multiplier 82 and the first volumes V1 of the mount assembly 20. The second fluid supply line 86 extends from the pressure multiplier 82 to the second port 72 for providing fluid communication between the pressure multiplier 82 and the second volumes V2 of the mount assembly 20. As a result, the pressure multiplier 82 is in fluid communication with the first cavity and the vehicle hydraulic system.

The present invention further includes a method of adjusting stiffness in the mount assembly 20 in a vehicle in response to real time operating conditions of the vehicle. The method comprises of the step of moving the plate 42 axially in the second cavity to compress the pad 44 of the mount assembly 20 to establish a predetermined stiffness of the mount assembly 20. The predetermined stiffness of the mount assembly 20 is determined to improve ride and handling of the vehicle, noise isolation, and vibration control.

The method comprises the steps of sensing external and gravitational forces being applied to the vehicle. As one example, accelerometers placed throughout the vehicle could be used to measure the external and gravitation forces being applied to the vehicle. However, any number of methods known in the art could be used for measuring the external and gravitational forces being applied to the vehicle.

The method comprises the step of integrating the external and gravitational forces to establish a plurality of variable and instantaneous operating conditions of the vehicle. In one embodiment of the present invention, the pressure multiplier 82 communicates with a central computer that integrates the external and gravitation forces and establishes the plurality of variable and instantaneous operating conditions of the vehicle and communicates the variable and instantaneous operation conditions to the pressure multiplier 82.

The method comprises the step of multiplying hydraulic fluid pressure from the vehicle hydraulic system by the pressure multiplier 82, and applying the multiplied hydraulic pressure from the pressure multiplier 82 to the first cavity in proportion to various ones of the operating conditions of the vehicle.

The method also comprises the step of rotating the screw mechanism in response to the multiplied hydraulic pressure from the pressure multiplier 82 to the first cavity to move the plate 42 and to adjust the stiffness of the pad 44 and to establish a predetermined stiffness position. The step of rotating the screw mechanism includes rotating the vanes 56 extending radially from the center axis A in response to the multiplied hydraulic pressure to rotate the screw mechanism between the predetermined stiffness positions.

The method additionally comprises of terminating the multiplied hydraulic pressure from the pressure multiplier 82 to establish a static condition of the screw mechanism and the self-locking to hold the predetermined stiffness position of the pad 44.

Obviously, many modifications and variations of the present invention are possible in light of the above teachings and may be practiced otherwise than as specifically described while within the scope of the appended claims. Antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:
1. A mount assembly comprising:
a first housing extending around and along a center axis and defining a first cavity,
a second housing extending around and along said center axis from said first housing to a cap to define a second cavity,
a plate disposed on said center axis in said second cavity,
a pad of an elastomeric material having a stiffness and being disposed on said center axis in said second cavity between said plate and said cap,
an actuator disposed on said center axis in said first cavity and extending along said center axis into said second cavity and coupled to said plate, said actuator being a screw mechanism including a sleeve being rotatable about said center axis relative to said first housing and defining an internal screw-thread facing said center axis, said screw mechanism including a collar disposed along said center axis and extending axially into said sleeve from and non-rotatably secured to said plate, said collar defining an external screw-thread facing away from said center axis and engaging said internal screw-thread of said sleeve for causing axial movement of said collar and said plate in response to relative rotation between said sleeve and said collar, said external screw-thread and said internal screw-thread having a coefficient of friction therebetween and a lead angle with the tangent of said lead angle being less than said coefficient of friction for providing self-locking between said screw-threads and said screw-threads preventing relative rotation between said sleeve and said collar below a predetermined force therebetween, and whereby a fluid pressure in said first housing overcomes said predetermined force and causes said sleeve to rotate around said center axis for moving said collar and said plate axially along said center axis to change the stiffness of said pad and whereby an absence of the fluid pressure results in said self-locking between said screw-threads.

2. An assembly as set forth in claim 1 wherein said first housing further includes a plurality of partitions disposed in said first cavity to define a plurality of chambers between said partitions for enclosing a fluid in each of said chambers.

3. An assembly as set forth in claim 2 wherein said screw mechanism further includes a plurality of vanes with each coupled to and extending radially from said sleeve into respective ones of said chambers with each one of said vanes being spaced from and between two of said partitions to divide each one of said chambers into a first volume and a second volume and said vanes being rotatable with said sleeve in said chambers around said center axis to vary the ratio between said volumes and whereby a difference in fluid pressure between said volumes overcomes said predetermined force between said screw-threads and rotates said vanes around said center axis with said sleeve for moving said collar and said plate axially along said center axis for changing the stiffness of said pad and whereby an absence of the difference in fluid pressure between said volumes results in said self-locking between said screw-threads.

4. An assembly as set forth in claim 1 wherein said second housing further includes a plurality of ribs that are semi-circular in cross section and extend inwardly towards said center axis.

5. An assembly as set forth in claim 4 further including said plate having a plurality of grooves with each being semi-circular and sized to receive and slidably engage one of said ribs for preventing said plate and said collar from rotating about said center axis while allowing axial movement of said collar and said plate in response to rotation of said sleeve.

6. An assembly as set forth in claim 3 wherein said first housing further includes a sidewall extending annularly around and along said center axis between a first periphery and a second periphery and a base disposed at said first periphery and a first port and a second port extending radially through said sidewall at said first periphery.

7. An assembly as set forth in claim 6 wherein said first housing further includes a first conduit extending from said first port and annularly around said center axis in said base.

8. An assembly as set forth in claim 7 wherein said first conduit includes a plurality of first apertures establishing fluid communication between said first conduit and each of said first volumes and being spaced adjacent to and on the side of and counterclockwise from each one of said partitions for supplying the fluid through said first port and said first conduit into each one of said first volumes.

9. An assembly as set forth in claim 8 wherein said first housing further includes a second conduit extending from said second port and annularly around said center axis in said base.

10. An assembly as set forth in claim 9 wherein said second conduit includes a plurality of second apertures establishing fluid communication between said second conduit and each of said second volumes and being spaced adjacent to and on the side of and clockwise from each one of said partitions for supplying the fluid through said second port and said second conduit into each one of said second volumes.

11. A method of adjusting stiffness in a mount in a vehicle in response to real time operating conditions of the vehicle, the mount including a pad of an elastomeric material and a screw mechanism disposed on a center axis to compress the pad and being self-locking in a static state, said method comprising the steps of;

compressing the pad of an elastomeric material of the mount to establish a predetermined stiffness of the mount, sensing external and gravitational forces being applied to the vehicle, combining the external and gravitational forces to establish a plurality of both variable and instantaneous operating conditions of the vehicle, multiplying hydraulic fluid pressure from a vehicle hydraulic system in response to various ones of the operating conditions of the vehicle, rotating the screw mechanism in response to the multiplied hydraulic pressure in response to various ones of the operating conditions of the vehicle to compress and adjust the stiffness of the pad and to establish a predetermined stiffness position, terminating the multiplied hydraulic pressure to establish a static condition of the screw mechanism and the self-locking to hold the predetermined stiffness position of the pad.

12. A method as set forth in claim 11 wherein said step of rotating the screw mechanism includes rotating vanes extending radially from the center axis in response to the multiplied hydraulic pressure to rotate the screw mechanism between the predetermined stiffness positions.

* * * * *